US012625420B2

(12) United States Patent (10) Patent No.: US 12,625,420 B2

Takagi et al. (45) Date of Patent: May 12, 2026

---

(54) LIGHT SOURCE DEVICE AND PROJECTOR

(71) Applicant: SEIKO EPSON CORPORATION, Tokyo (JP)

(72) Inventors: Chigusa Takagi, Azumino (JP); Shoichi Uchiyama, Shimosuwa-machi (JP); Tetsuo Shimizu, Matsumoto (JP); Tomoko Akagawa, Matsumoto (JP); Ryota Tatsumi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 393 days.

(21) Appl. No.: 18/191,072

(22) Filed: Mar. 28, 2023

(65) Prior Publication Data

US 2023/0305379 A1 Sep. 28, 2023

(30) Foreign Application Priority Data

Mar. 28, 2022 (JP) ................................. 2022-052359

(51) Int. Cl.
G03B 21/20 (2006.01)

(52) U.S. Cl.
CPC ....... G03B 21/204 (2013.01); G03B 21/2066 (2013.01)

(58) Field of Classification Search
CPC .......................... G03B 21/204; G03B 21/2066
USPC ......................................................... 353/98
See application file for complete search history.

(56) References Cited

U.S. PATENT DOCUMENTS

| | | | |
|---|---|---|---|
| 2015/0198305 A1* | 7/2015 | Sunaga | F21V 29/70 |
| | | | 362/84 |
| 2019/0302591 A1 | 10/2019 | Nojima | |
| 2020/0409248 A1* | 12/2020 | Yasumatsu | G03B 21/2013 |
| 2021/0165312 A1* | 6/2021 | Yasumatsu | H04N 9/3158 |
| 2023/0236490 A1* | 7/2023 | Aoki | G03B 21/204 |
| | | | 353/119 |

FOREIGN PATENT DOCUMENTS

| | | | | |
|---|---|---|---|---|
| CN | 101047101 A | | 10/2007 | |
| JP | 2005300954 A | * | 10/2005 | G02B 6/42 |
| JP | 2012054272 A | | 3/2012 | |
| JP | 2015022954 A | | 2/2015 | |
| JP | 2015022955 A | | 2/2015 | |
| JP | 2018190805 A | | 11/2018 | |
| JP | 2021106299 A | | 7/2021 | |

* cited by examiner

*Primary Examiner* — Magda Cruz
(74) *Attorney, Agent, or Firm* — Dority & Manning, P.A.

(57) ABSTRACT

A light source device includes a first laser emitter configured to emit first light, a light transmissive member having a first surface and a second surface, the first light emitted from the first laser emitter being incident on the second surface, a base having a first support part configured to support the first laser emitter and a second support part configured to support the light transmissive member, and a wavelength converter arranged on the first surface and configured to convert the first light into second light. The wavelength converter has an incident surface including an incident area where the first light enters and an emission surface disposed at an opposite side to the incident surface and configured to emit the second light. The second support part supports the second surface of the light transmissive member in an area corresponding to the incident area.

16 Claims, 7 Drawing Sheets

LIGHT SOURCE DEVICE AND PROJECTOR

The present application is based on, and claims priority from JP Application Serial Number 2022-052359, filed Mar. 28, 2022, the disclosure of which is hereby incorporated by reference herein in its entirety.

BACKGROUND

1. Technical Field

The present disclosure relates to a light source device and a projector.

2. Related Art

In the past, there has been a light source device which makes excitation light emitted from a laser element enter a wavelength converter from a reverse surface, and then emits fluorescence generated by the wavelength converter from an obverse surface of the wavelength converter (see, e.g., JP-A-2021-106299). In this light source device, a periphery of a transparent radiator substrate provided with the wavelength converter is supported with a radiator member shaped like a frame. The heat of the wavelength converter is released to the radiator member via a light transmissive member.

However, in the light source device described above, since a radiation path from the wavelength converter to the radiation member is long, there is a problem that the temperature of the wavelength converter rises to thereby deteriorate luminous efficiency.

SUMMARY

In view of the problems described above, a light source device according to the present disclosure includes a first laser emitter configured to emit first light in a first wavelength band, a light transmissive member having a first surface and a second surface opposite to the first surface, the first light emitted from the first laser emitter being incident on the second surface, a base having a first support part configured to support the first laser emitter, and a second support part configured to support the light transmissive member, and a wavelength converter arranged on the first surface of the light transmissive member and configured to convert the first light into second light in a second wavelength band different from the first wavelength band. The wavelength converter has an incident surface including an incident area where the first light enters and an emission surface disposed at an opposite side to the incident surface and configured to emit the second light. The second support part supports the second surface of the light transmissive member in an area corresponding to the incident area.

A projector according to the present disclosure includes the light source device described above, a light modulation device configured to modulate the light emitted from the light source device, and a projection optical device configured to project the light modulated by the light modulation device.

BRIEF DESCRIPTION OF THE DRAWINGS

FIG. 1 is a diagram showing a schematic configuration of a projector according to a first embodiment.
FIG. 2 is a schematic configuration diagram of an illumination device.

DESCRIPTION OF EXEMPLARY EMBODIMENTS

Figures 3, 4:
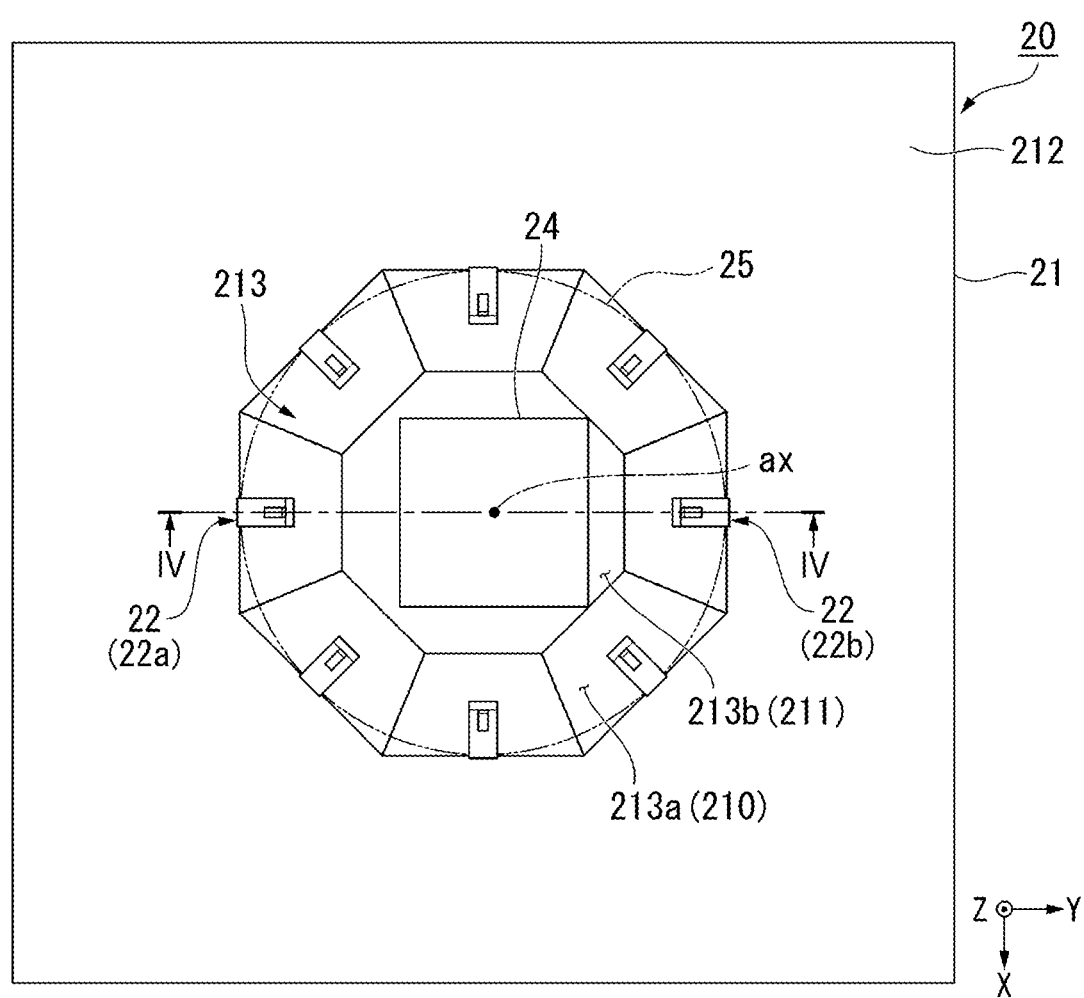
FIG. 3 is a plan view of a light source device 20.
FIG. 4 is a cross-sectional view according to an arrow view along the line IV-IV in FIG. 3.

Some embodiments of the present disclosure will hereinafter be described in detail with reference to the drawings.
It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

Figure 1:
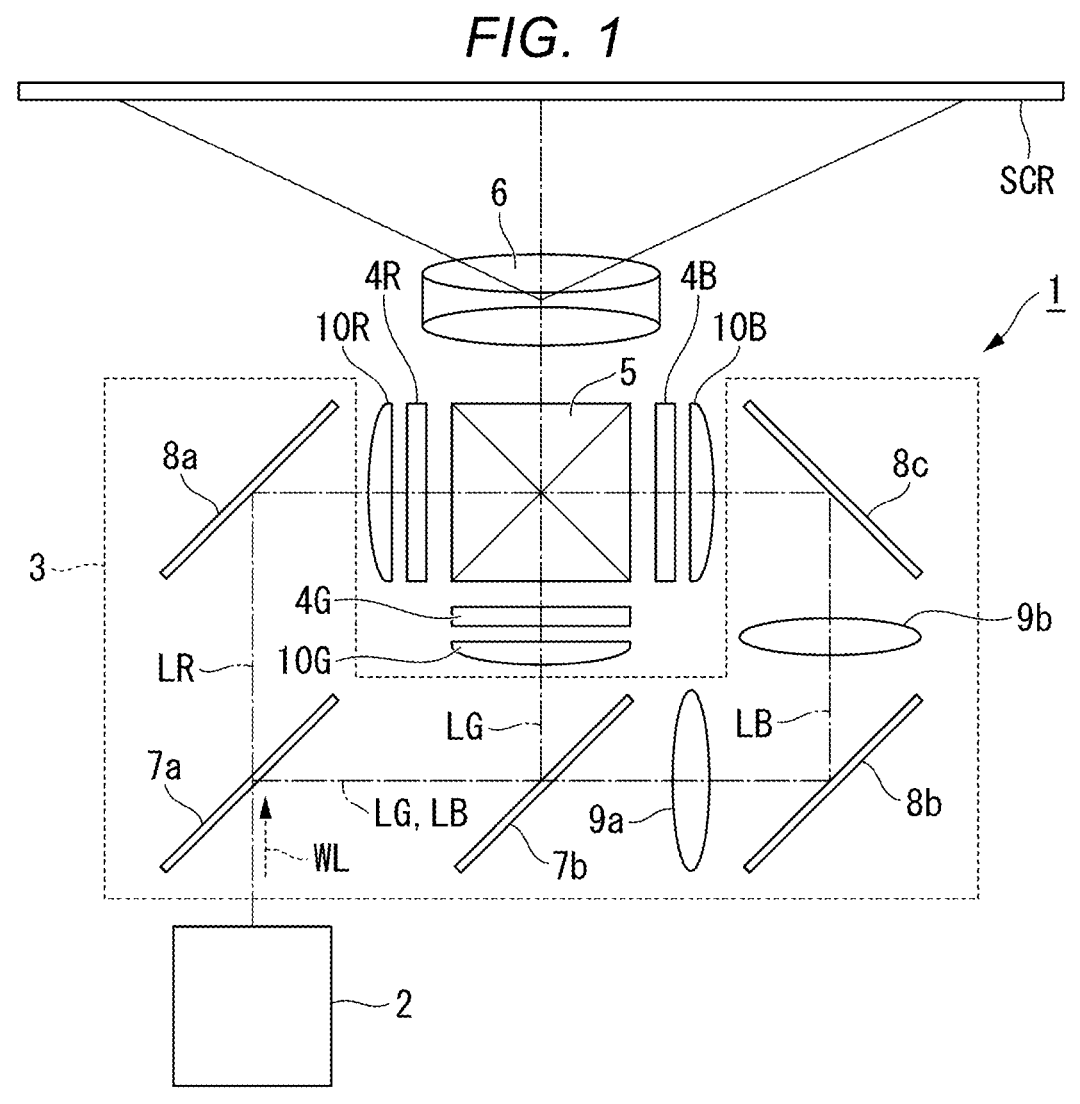

An example of a projector according to the present embodiment will be described.
FIG. 1 is a diagram showing a schematic configuration of the projector according to the present embodiment.
As shown in FIG. 1, the projector 1 according to the present embodiment is a projection-type image display device for displaying a color image on a screen SCR. The projector 1 is provided with a color separation optical system 3, a light modulation device 4R, a light modulation device 4G, a light modulation device 4B, a combining optical system 5, a projection optical device 6, and an illumination device 2.
The color separation optical system 3 separates illumination light WL having a white color from the illumination device 2 into red light LR, green light LG, and blue light LB. The color separation optical system 3 is provided with a first dichroic mirror 7a and a second dichroic mirror 7b, a first reflecting mirror 8a, a second reflecting mirror 8b, and a third reflecting mirror 8c, and a first relay lens 9a and a second relay lens 9b.
The first dichroic mirror 7a separates the illumination light WL from the illumination device 2 into the red light LR and the rest of the light, namely the green light LG and the blue light LB. The first dichroic mirror 7a transmits the red light LR separated, and at the same time, reflects the rest of the light. The second dichroic mirror 7b reflects the green light LG, and at the same time, transmits the blue light LB.

The first reflecting mirror 8a reflects the red light LR toward the light modulation device 4R. The second reflecting mirror 8b and the third reflecting mirror 8c guide the blue light LB to the light modulation device 4B. The green light LG is reflected by the second dichroic mirror 7b toward the light modulation device 4G.

The first relay lens 9a is disposed in a posterior stage of the second dichroic mirror 7b in the light path of the blue light LB. The second relay lens 9b is disposed in a posterior stage of the second reflecting mirror 8b in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are respectively disposed polarization plates not shown, and thus, there is formed the configuration of transmitting only the linearly-polarized light having a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate the principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus synthesized toward the projection optical device 6. As the combining optical system 5, there is used, for example, a cross dichroic prism.

The projection optical device 6 is constituted by a plurality of lenses. The projection optical device 6 projects the image light having been synthesized by the combining optical system 5 toward the screen SCR in an enlarged manner. Thus, an image is displayed on the screen SCR.

Illumination Device

Figure 2:
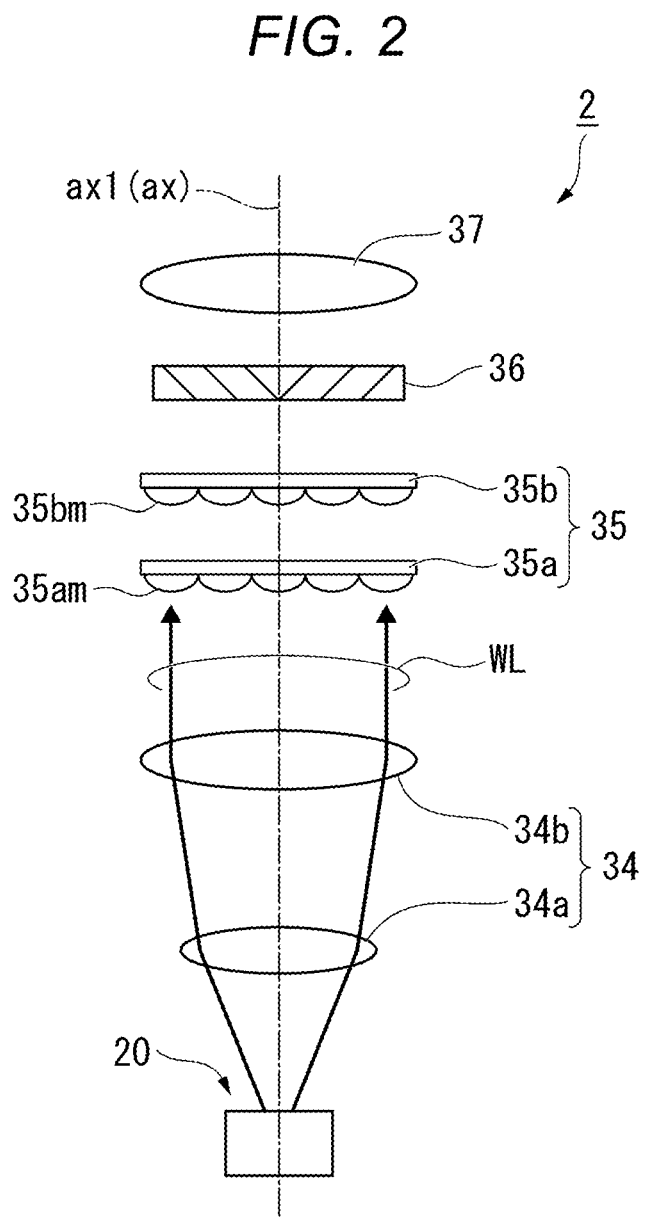

FIG. 2 is a schematic configuration diagram of the illumination device 2.

As shown in FIG. 2, the illumination device 2 is provided with a light source device 20, a pickup optical system 34, an integrator optical system 35, a polarization converter 36, and a superimposing lens 37.

The light source device 20 emits the illumination light WL having a white color toward the pickup optical system 34.

The pickup optical system 34 is constituted by, for example, pickup lenses 34a, 34b. The pickup optical system 34 has a function of picking up and then collimating the illumination light WL emitted from the light source device 20.

The illumination light WL collimated by the pickup optical system 34 enters the integrator optical system 35. The integrator optical system 35 is constituted by, for example, a first lens array 35a and a second lens array 35b.

The first lens array 35a includes a plurality of first small lenses 35am, and the second lens array 35b includes a plurality of second small lenses 35bm.

The first lens array 35a separates the illumination light WL into a plurality of small pencils. The first small lenses 35am form images of the small pencils on the corresponding second small lenses 35bm, respectively. The integrator optical system 35 cooperates with the superimposing lens 37 described later to thereby homogenize an illuminance distribution of each of the image formation areas of the light modulation devices 4R, 4G shown in FIG. 1 as the illumination target areas.

The illumination light WL having passed through the integrator optical system 35 enters the polarization converter 36. The polarization converter 36 is constituted by, for example, a polarization separation film and a retardation plate (a ½ wave plate). The polarization converter 36 converts a polarization direction in fluorescence YL into one polarization component.

The illumination light WL having passed through the polarization converter 36 enters the superimposing lens 37. The illumination light WL having been emitted from the superimposing lens 37 enters the color separation optical system 3. The superimposing lens 37 superimposes the plurality of small pencils described above forming the illumination light WL on each other in illumination target areas, namely image formation areas, of the light modulation devices 4R, 4G to thereby homogenously illuminate the image formation areas.

A configuration of the light source device 20 will hereinafter be described in detail. In the following drawings, each of the constituents of the light source device 20 will be described using an XYZ coordinate system as needed. The Z axis is an axis parallel to an optical axis ax of the light source device 20, the X axis is an axis which is perpendicular to the optical axis ax, and is parallel to a normal line of a base 21 constituting the light source device 20, and the Y axis and the Z axis are axes which are perpendicular to each other, and are perpendicular to the X axis. It should be noted that the optical axis ax of the light source device 20 coincides with an illumination light axis ax1 of the illumination device 2 shown in FIG. 2.

FIG. 3 is a plan view of the light source device 20. FIG. 3 is a diagram of the light source device 20 viewed from a direction (the Z-axis direction) along the optical axis ax.

As shown in FIG. 3, the light source device 20 is provided with the base 21, a plurality of laser emitters 22, a wavelength converter 24, and a light transmissive member 25.

The base 21 supports the plurality of laser emitters 22, the wavelength converter 24, and the light transmissive member 25. The base 21 is a metal plate excellent in radiation performance made of, for example, aluminum or copper.

When making a plan view viewed from the Z-axis direction along the optical axis ax (hereinafter simply referred to as a plan view), the plurality of laser emitters 22 is arranged in a circumferential direction around the optical axis ax. In the case of the present embodiment, the plurality of laser emitters 22 includes eight laser emitters 22. The plurality of laser emitters 22 is arranged so that a pair of elements are opposed to each other across the optical axis ax.

In the present embodiment, the plurality of laser emitters 22 includes a first laser emitter 22a and a second laser emitter 22b. The first laser emitter 22a and the second laser emitter 22b are arranged on the base 21 so as to be opposed to each other across the optical axis ax. The first laser emitter 22a is arranged at a −Y side with respect to the optical axis ax, and the second laser emitter 22b is arranged at a +Y side with respect to the optical axis ax.

The first laser emitter 22a and the second laser emitter 22b are hereinafter simply referred to as the laser emitters 22 in some cases when being not discriminated from the rest of the laser emitters.

FIG. 4 is a cross-sectional view of the light source device 20. FIG. 4 is a cross-sectional view according to an arrow view along the line IV-IV in FIG. 3, and is a cross-sectional view of the light source device 20 along a plane which includes the optical axis ax and is perpendicular to an X-Y plane. It should be noted that FIG. 4 is a cross-sectional view along a plane including the first laser emitter 22a and the second laser emitter 22b out of the plurality of laser emitters 22. In FIG. 4, in order to simplify the description, only the principal rays are illustrated with respect to excitation light E emitted from the first laser emitter 22a and the second laser emitter 22b.

As shown in FIG. 3 and FIG. 4, the base 21 has a first support part 210 for supporting the plurality of laser emitters 22 including the first laser emitter 22a and the second laser emitter 22b, and a second support part 211 for supporting the light transmissive member 25.

Each of the laser emitters 22 is thermally coupled to the base 21 via the first support part 210, and the light transmissive member 25 is thermally coupled to the base 21 via the second support part 211. In other words, the base 21 functions as a radiator member for releasing the heat of the laser emitters 22 and the light transmissive member 25.

The base 21 has a base part 212 and a protruding part 213. The base part 212 is a plate-like region. The protruding part 213 is a region protruding from one surface 212a of the base part 212. The protruding part 213 of the base 21 has a polygonal outer shape such as an octagonal outer shape in the plan view. The protruding part 213 is configured by chamfering an apex of an eight-sided pyramid. The protruding part 213 has eight side surfaces 213a each having a trapezoidal shape, and a top surface 213b having an octagonal shape.

On the side surfaces 213a of the protruding part 213, there are respectively arranged the laser emitters 22. The side surfaces 213a of the protruding part 213 constitute the first support part 210 for supporting the plurality of laser emitters including the first laser emitter 22a and the second laser emitter 22b. On the top surface 213b of the protruding part 213, there is arranged the light transmissive member 25. In the present embodiment, the protruding part 213 constitutes a second support part 211 for supporting the light transmissive member 25.

The laser emitters 22 each include the light emitting part 220 and a sub-mount 221. The light emitting part 220 emits the excitation light (first light) E in a first wavelength band. The first wavelength band is, for example, a wavelength band from a blue color to a violet color of 400 nm through 480 nm, and has a peak wavelength of, for example, 455 nm.

The sub-mounts 221 are each formed of a ceramic material such as aluminum nitride or alumina. The sub-mounts 221 each relax a thermal stress caused by a difference in linear expansion coefficient between the base 21 and the light emitting part 220. The sub-mounts 221 are each bonded to the first support part 210 (the side surface 213a) of the base 21 with a bonding material such as a silver brazing material or gold-tin solder.

The light transmissive member 25 is arranged at a light exit side of the laser emitters 22. The light transmissive member 25 has a circular shape in the plan view. The light transmissive member 25 is a plate-like member having an obverse surface (a first surface) 25a and a reverse surface (a second surface) 25b opposite to the obverse surface 25a. A part of the reverse surface 25b of the light transmissive member 25 is supported by the second support part 211 (the top surface 213b) of the base 21.

As a material forming the light transmissive member 25, there can be cited glass such as borosilicate glass, quartz glass, or quart glass, quartz crystal, sapphire, and so on. It should be noted that it is possible to form the light transmissive member 25 from a high thermal conductive member such as sapphire to thereby make the light transmissive member 25 function as a radiator member for releasing the heat of the wavelength converter 24.

The base 21 and the light transmissive member 25 are bonded to each other with a bonding material such as an organic adhesive, a metal bonding material, or an inorganic bonding material. As the organic adhesive, there is preferably used, for example, a silicone-based adhesive, an epoxy resin-based adhesive, or an acrylic resin-based adhesive. As the metal bonding material, there is preferably used, for example, a silver brazing material or gold-tin solder. As the inorganic bonding material, there is preferably used, for example, low-melting-point glass.

The reverse surface 25b of the light transmissive member 25 is opposed to the light exit surface of each of the laser emitters 22 in an area different from an area where the light transmissive member 25 is supported by the second support part 211. Therefore, the excitation light E emitted from each of the laser emitters 22 enters the reverse surface 25b of the light transmissive member 25.

On the obverse surface 25a of the light transmissive member 25, there is arranged the wavelength converter 24.

The wavelength converter 24 has a plane of incidence 24a including an incident area SP which the excitation light E enters, and an exit surface 24b for emitting the fluorescence YL. In the wavelength converter 24 in the present embodiment, the exit surface 24b is a surface disposed at an opposite side to the plane of incidence 24a. In other words, the wavelength converter 24 in the present embodiment is a so-called transmissive wavelength converter which emits light from the exit surface 24b opposite to the plane of incidence 24a along an incident direction of the excitation light E to the plane of incidence 24a.

In the light source device 20 according to the present embodiment, an uneven structure 26 is formed on the plane of incidence 24a of the wavelength converter 24. The uneven structure 26 has contact with the obverse surface 25a of the light transmissive member 25. Thus, it is possible to provide fine gaps between the plane of incidence 24a of the wavelength converter 24 and the obverse surface 25a of the light transmissive member 25 without using a member such as a spacer. An air layer exists in the fine gap. In other words, in the present embodiment, the air layer A is disposed between the plane of incidence 24a of the wavelength converter 24 and the obverse surface 25a of the light transmissive member 25. Specifically, the air layer A is provided to the uneven structure 26 formed on the plane of incidence 24a of the wavelength converter 24. Such an uneven structure 26 is formed by performing, for example, a sandblast treatment on the plane of incidence 24a.

It should be noted that although there is cited when forming the uneven structure 26 on the plane of incidence 24a of the wavelength converter 24 to thereby dispose the air layer A between the plane of incidence 24a of the wavelength converter 24 and the obverse surface 25a of the light transmissive member 25 as an example in the present embodiment, it is possible to dispose an air layer in an uneven structure formed in an area opposed to the plane of incidence 24a in the obverse surface 25a of the light transmissive member 25.

The wavelength converter 24 includes a phosphor for converting the excitation light E into the fluorescence (second light) YL in a second wavelength band different from the first wavelength band. The second wavelength band is a yellow wavelength band of, for example, 550 through 640 nm. As such a phosphor, there can be used, for example, a YAG (yttrium aluminum garnet) based phosphor. It should be noted that the constituent material of the phosphor can be unique, or it is also possible to use a mixture of the particles formed using two or more types of materials as the phosphor.

Then, there will be described when emitting the illumination light WL from the light source device 20 according to the present embodiment.

First, the excitation light E is emitted from each of the laser emitters 22 arranged so as to surround the periphery of the wavelength converter 24 toward the reverse surface 25b of the light transmissive member 25. It should be noted that the excitation light E emitted from each of the laser emitters 22 exhibits the same behavior in the light transmissive member 25. Therefore, the description will hereinafter be presented citing the behavior of the excitation light E emitted from the first laser emitter 22a as an example.

The first laser emitter 22a emits the excitation light E toward the reverse surface 25b of the light transmissive member 25. The first laser emitter 22a emits the excitation light E in an oblique direction with respect to the reverse surface 25b of the light transmissive member 25. When the excitation light E enters the reverse surface 25b of the light transmissive member 25, the excitation light E is refracted and then enters wavelength converter 24 disposed on the obverse surface 25a of the light transmissive member 25. It should be noted that in FIG. 4, in order to make the drawing eye-friendly, the refraction of the excitation light E is not expressed, but the excitation light E is shown as if being transmitted straight through the reverse surface 25b.

Here, when the excitation light E obliquely enters the wavelength converter 24, there is a possibility that the light intensity of the excitation light E reflected by the surface of the wavelength converter 24 increases. Such excitation light E as being reflected by the surface of the wavelength converter 24 is high in deviation of the angular characteristic, and is high in probability of becoming stray light which is not available as the illumination light. Further, the stray light component is absorbed by other optical members and so on in the device to thereby cause a local rise in temperature to become a cause breakage in some cases.

In contrast, in the wavelength converter 24 in the present embodiment, by scattering the excitation light E with the uneven structure 26 formed on the plane of incidence 24a of the wavelength converter 24, it is possible to suppress the light intensity of the excitation light E to be reflected by the surface of the plane of incidence 24a. Further, since the excitation light E is scattered by the uneven structure 26 to suppress the deviation of the angular characteristic even when the excitation light E is supposedly reflected by the plane of incidence 24a, it is possible to prevent an occurrence of a problem such as a deterioration of a light use efficiency and heat generation due to the stray light.

Figure 5:
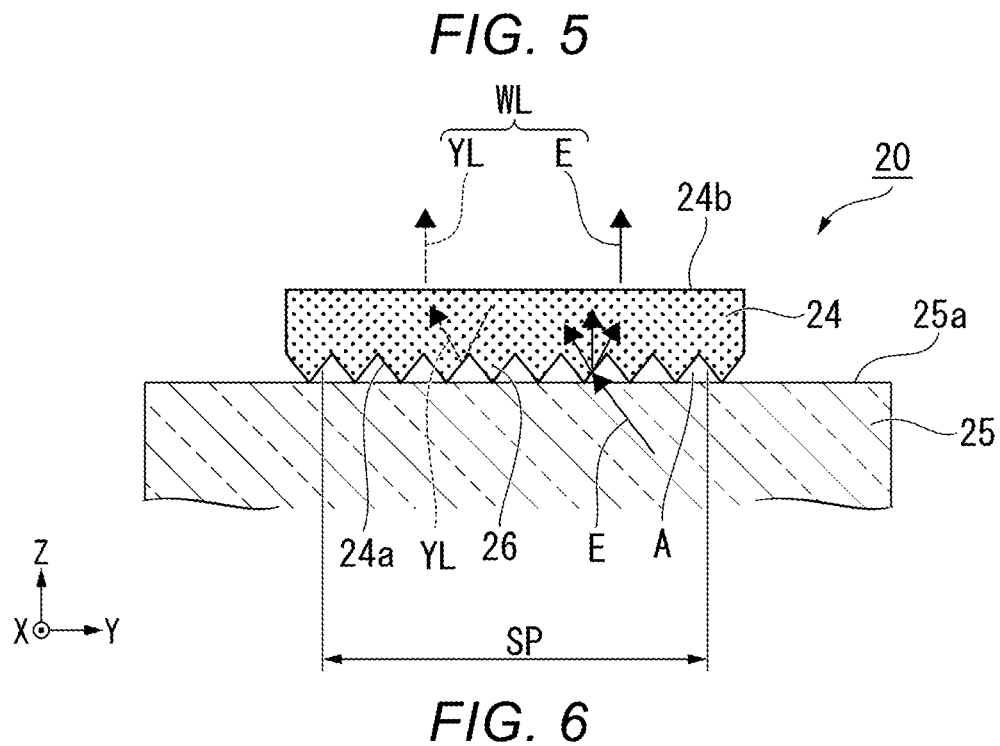
FIG. 5 is a cross-sectional view showing a configuration of an essential part of a wavelength converter.

FIG. 5 is a cross-sectional view showing a configuration of an essential part of the wavelength converter 24.

As shown in FIG. 5, the wavelength converter 24 emits, from the exit surface 24b, the illumination light WL having a white color and including the fluorescence YL obtained by performing the wavelength conversion on the excitation light E entering the wavelength converter 24 from the plane of incidence 24a and a part of the excitation light E not converted into the fluorescence.

A part of the fluorescence YL proceeds toward the plane of incidence 24a of the wavelength converter 24. In the case of the present embodiment, it is possible to reflect the fluorescence YL toward the exit surface 24b by the air layer A disposed between the plane of incidence 24a of the wavelength converter 24 and the obverse surface 25a of the light transmissive member 25.

In the present embodiment, it is preferable to make the contact area between the plane of incidence 24a of the wavelength converter 24 and the obverse surface 25a of the light transmissive member 25 as small as possible. When the contact area between the plane of incidence 24a and the obverse surface 25a decreases, the surface area of the air layer A having contact with the plane of incidence 24a increases. When the surface area of the air layer A having contact with the plane of incidence 24a increases as described above, the total reflection of the fluorescence YL by an interface between the air layer A described above and the plane of incidence 24a becomes more apt to occur. Therefore, it is possible to more efficiently take out the fluorescence YL as the illumination light WL.

In the light source device 20 according to the present embodiment, the wavelength converter 24 generates heat when generating the excitation light E. In the case of the present embodiment, it is preferable to make the thickness of the air layer A as thin as possible. In other words, it is preferable to make the depth of the unevenness of the uneven structure 26 shallower. Since the thinner the air layer A is made as described above, the easier it becomes to transfer the heat of the wavelength converter 24 toward the light transmissive member 25, the performance of cooling the wavelength converter 24 is enhanced.

In the present embodiment, as shown in FIG. 4, the top surface 213b of the protruding part 213 forming the second support part 211 supports an area corresponding to the incident area SP out of the reverse surface 25b of the light transmissive member 25. The top surface 213b of the protruding part 213 is a support surface for supporting the light transmissive member 25 in the second support part 211.

In the present embodiment, the area corresponding to the incident area SP out of the reverse surface 25b means an area overlapping the incident area SP of the excitation light E in the plan view in the plane of incidence 24a of the wavelength converter 24 out of the reverse surface 25b when making the plan view. Generally, the excitation light E enters a part of the plane of incidence 24a, the area of the incident area SP becomes smaller than the area of the plane of incidence 24a.

In the wavelength converter 24, the temperature becomes the highest in the incident area SP out of the plane of incidence 24a. Therefore, in the light transmissive member 25, the temperature on the obverse surface 25a opposed to the incident area SP of the wavelength converter 24 becomes the highest, and the heat of the obverse surface 25a is transferred to an area opposed to the incident area SP out of the reverse surface 25b.

As shown in FIG. 4, in the light source device 20 according to the present embodiment, the reverse surface 25b in a portion corresponding to the incident area SP which becomes the highest in temperature in the obverse surface 25a is supported by the second support part 211 of the base 21. Further, in the case of the present embodiment, the area of a support surface (the top surface 213b) of the light transmissive member 25 in the second support part 211 is larger than the area of the incident area SP of the wavelength converter 24. Therefore, since the heat of the wavelength converter 24 is efficiently transferred to the base 21 via the light transmissive member 25, it is possible to further enhance the performance of cooling the wavelength converter 24.

In such a manner, the light source device 20 emits the illumination light WL having a white color including a part of the excitation light E and the fluorescence YL from the exit surface 24b of the wavelength converter 24.

According to the light source device 20 related to the present embodiment described hereinabove, the following advantages are exerted.

The light source device 20 according to the present embodiment is provided with the plurality of laser emitters 22 including the first laser emitter 22a for emitting the excitation light E, the light transmissive member 25 which has the obverse surface 25a and the reverse surface 25b, and the reverse surface 25b which the excitation light E emitted from the first laser emitter 22a enters, the base 21 having the first support part 210 for supporting the first laser emitter 22a and the second support part 211 for supporting the light transmissive member 25, and the wavelength converter 24 which is arranged on the obverse surface 25a of the light transmissive member 25, and which converts the excitation light E into the fluorescence YL in the yellow wavelength band. The wavelength converter 24 has the plane of incidence 24a including the incident area SP which the excitation light E enters, and the exit surface 24b which is disposed at an opposite side to the plane of incidence 24a, and which emits the fluorescence YL. The second support part 211 supports the area corresponding to the incident area SP out of the reverse surface 25b of the light transmissive member 25.

In the light source device 20 according to the present embodiment, the reverse surface 25b of the light transmissive member 25 corresponding to the incident area SP which becomes the highest in temperature in the plane of incidence 24a of the wavelength converter 24 is supported by the base 21. Therefore, the heat having been transferred from the incident area SP of the wavelength converter 24 toward the reverse surface 25b of the light transmissive member 25 can efficiently be released from the second support part 211 of the base 21. Therefore, since the rise in temperature of the wavelength converter 24 is suppressed, and thus the fluorescence conversion efficiency increases, it is possible to take out the fluorescence YL high in luminance as the illumination light WL.

In the light source device 20 according to the present embodiment, the air layer A is disposed between the plane of incidence 24a of the wavelength converter 24 and the obverse surface 25a of the light transmissive member 25.

According to this configuration, due to the air layer A disposed between the plane of incidence 24a of the wavelength converter 24 and the obverse surface 25a of the light transmissive member 25, it is possible to reflect the fluorescence YL proceeding toward the plane of incidence 24a inside the wavelength converter 24 to emit the fluorescence YL from the exit surface 24b. Thus, it is possible to increase the intensity of the fluorescence YL taken out as the illumination light WL.

In the light source device 20 according to the present embodiment, the uneven structure 26 is formed on the plane of incidence 24a of the wavelength converter 24, and the air layer A is provided to the uneven structure 26.

According to this configuration, by using the uneven structure 26 formed on the plane of incidence 24a, it is possible to easily realize the configuration of disposing the air layer A between the plane of incidence 24a of the wavelength converter 24 and the obverse surface 25a of the light transmissive member 25.

In the light source device 20 according to the present embodiment, the second support part 211 has the top surface 213b for supporting the reverse surface 25b of the light transmissive member 25, and the area of the top surface 213b is larger than the area of the incident area SP of the wavelength converter 24.

According to this configuration, since it is possible to efficiently release the heat from the wavelength converter 24 to the base 21, it is possible to further enhance the performance of cooling the wavelength converter 24. Thus, it is possible to take out the fluorescence YL higher in luminance as the illumination light WL by increasing the fluorescence conversion efficiency of the wavelength converter 24.

According to the projector 1 related to the present embodiment described hereinabove, the following advantages are exerted.

The projector 1 according to the present embodiment is provided with the light source device 20, the light modulation devices 4B, 4G, and 4R, and the projection optical device 6, wherein the light modulation devices 4B, 4G, and 4R modulate the blue light LB, the green light LG, and the red light LR from the light source device 20 to thereby form the image light, and the projection optical device 6 projects the image light described above.

According to the projector 1 related to the present embodiment, since there is provided the light source device 20 for generating the illumination light WL including the fluorescence YL high in luminance, it is possible to form and then project an image high in luminance.

Second Embodiment

Then, a configuration of a light source device according to a second embodiment of the present disclosure will be described. It should be noted that in the present embodiment, constituents or members common to the first embodiment will be denoted by the same reference symbols, and the detailed description thereof will be omitted.

Figure 6:
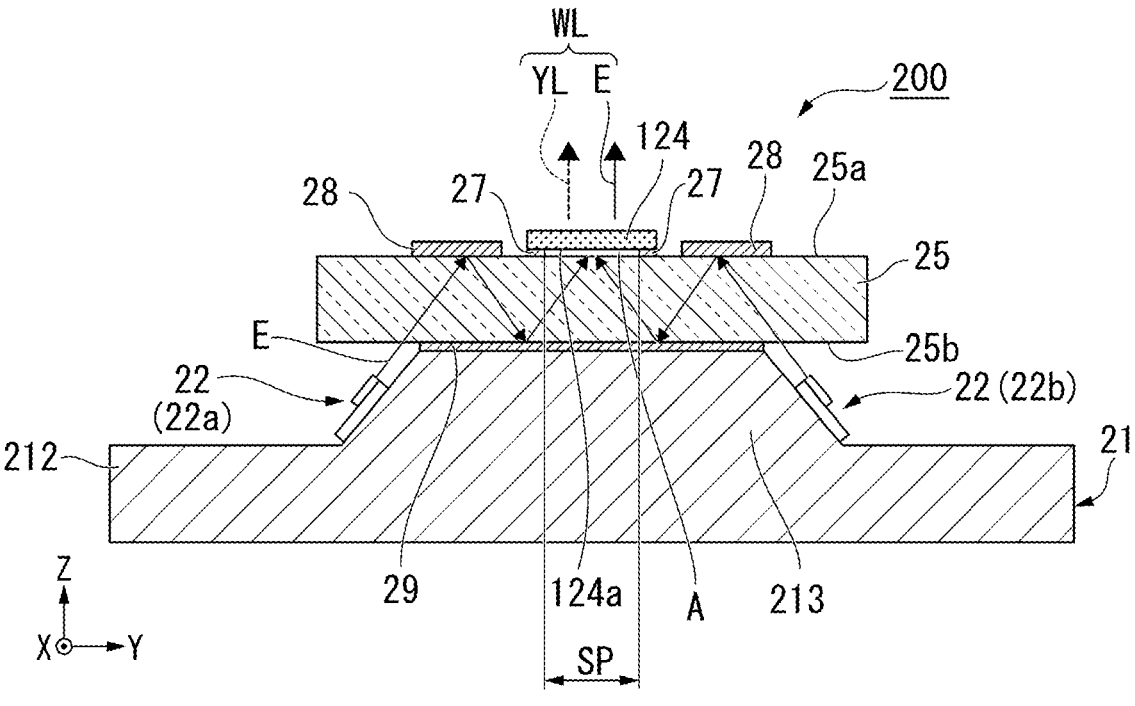
FIG. 6 is a diagram showing a configuration of a light source device according to a second embodiment.

FIG. 6 is a diagram showing the configuration of the light source device according to the present embodiment.

As shown in FIG. 6, the light source device 200 according to the present embodiment is provided with the base 21, the plurality of laser emitters 22, a wavelength converter 124, the light transmissive member 25, a spacer 27, a first reflector 28, and a second reflector 29.

In the light source device 200 according to the present embodiment, the wavelength converter 124 is disposed on the obverse surface 25a of the light transmissive member 25 via the spacer 27. In other words, the spacer 27 is disposed between a plane of incidence 124a of the wavelength converter 124 and the obverse surface 25a of the light transmissive member 25. No uneven structure is formed on the plane of incidence 124a of the wavelength converter 124 in the present embodiment. Therefore, the plane of incidence 124$a$ is formed of a flat surface.

It should be noted that the spacer 27 is disposed at a position where the spacer 27 does not overlap the incident area SP which the excitation light E enters in the plane of incidence 124$a$ of the wavelength converter 124. Further, by using a high thermal conductive material such as metal or ceramics as the material of the spacer 27, it is possible to release the heat of the wavelength converter 24 to the light transmissive member 25 via the spacer 27.

In the present embodiment, the air layer A is disposed between the plane of incidence 124$a$ of the wavelength converter 124 and the obverse surface 25$a$ of the light transmissive member 25. Specifically, the air layer A is disposed in a space formed by the spacer 27 between the plane of incidence 124$a$ and the obverse surface 25$a$.

The first reflector 28 is arranged in an area different from the wavelength converter 24 on the obverse surface 25$a$ of the light transmissive member 25. The second reflector 29 is arranged between the second support part 211 and the reverse surface 25$b$ of the light transmissive member 25. The first reflector 28 and the second transmissive member 29 are each formed of a mirror such as a metal film or a dielectric multilayer film.

The first reflector 28 reflects the excitation light E emitted from each of the laser emitters 22 toward the second reflector 29. The excitation light E reflected by the first reflector 28 is reflected by the second reflector 29 toward the wavelength converter 24.

Then, there will be described when emitting the illumination light WL from the light source device 200 according to the present embodiment. The description will hereinafter be presented citing the behavior of the excitation light E emitted from the first laser emitter 22$a$ as an example.

The excitation light E emitted from the first laser emitter 22$a$ enters an inside of the light transmissive member 25 from the reverse surface 25$b$, and enters the first reflector 28 disposed on the obverse surface 25$a$ of the light transmissive member 25. The first reflector 28 reflects the excitation light beams E toward the second reflector 29. The second reflector 29 reflects the excitation light E toward the wavelength converter 124.

According to the light source device 200 related to the present embodiment, when making the excitation light E enter the obverse surface 25$a$ of the light transmissive member 25 at a small incident angle, it is possible to make the excitation light E enter the wavelength converter 124 by the first reflector 28 and the second reflector 29 reflecting and propagating the excitation light E even when arranging the incident position of the excitation light E and the wavelength converter 124 so as to be separated from each other. Therefore, the degree of freedom of an arrangement of the laser emitters 22 and the wavelength converter 24 increases.

Further, according to the light source device 200 related to the present embodiment, since the excitation light E enters the obverse surface 25$a$ of the light transmissive member 25 at a small incident angle, it is possible to prevent the reflection of the excitation light E by the obverse surface 25$a$ of the light transmissive member 25. Therefore, by efficiently taking the excitation light E in the light transmissive member 25 and making the excitation light E enter the wavelength converter 124, it is possible to efficiently take out the fluorescence YL as the illumination light WL.

Further, in the case of the present embodiment, the excitation light E is reflected twice until the excitation light E emitted from the laser emitter 22 enters the wavelength converter 124. Here, the number of times of the reflection of the excitation light E until the excitation light enters the wavelength converter 124 becomes four or more, the light density of the excitation light E increases due to an influence of a variation in mounting the laser emitters 22 to thereby raise the temperature of the wavelength converter 124, and there is a possibility that the deterioration of the fluorescence conversion efficiency and the breakage due to the heat occur. In contrast, in the case of the present embodiment, by setting the number of times of the reflection of the excitation light E to two, it is possible to minimize the influence of the variation in mounting the laser emitters 22 described above.

It should be noted that it is possible to scatter the excitation light E on the plane of incidence 124$a$ to thereby increase the efficiency of taking the excitation light E into the wavelength converter 124 by disposing the uneven structure 26 on the plane of incidence 124$a$ of the wavelength converter 124 instead of the spacer 27 in the light source device 200 according to the present embodiment. Further, it is possible to dispose both of the spacer 27 and the uneven structure 26.

Third Embodiment

Then, a configuration of a light source device according to a third embodiment of the present disclosure will be described. It should be noted that in the present embodiment, constituents or members common to the second embodiment will be denoted by the same reference symbols, and the detailed description thereof will be omitted.

Figure 7:
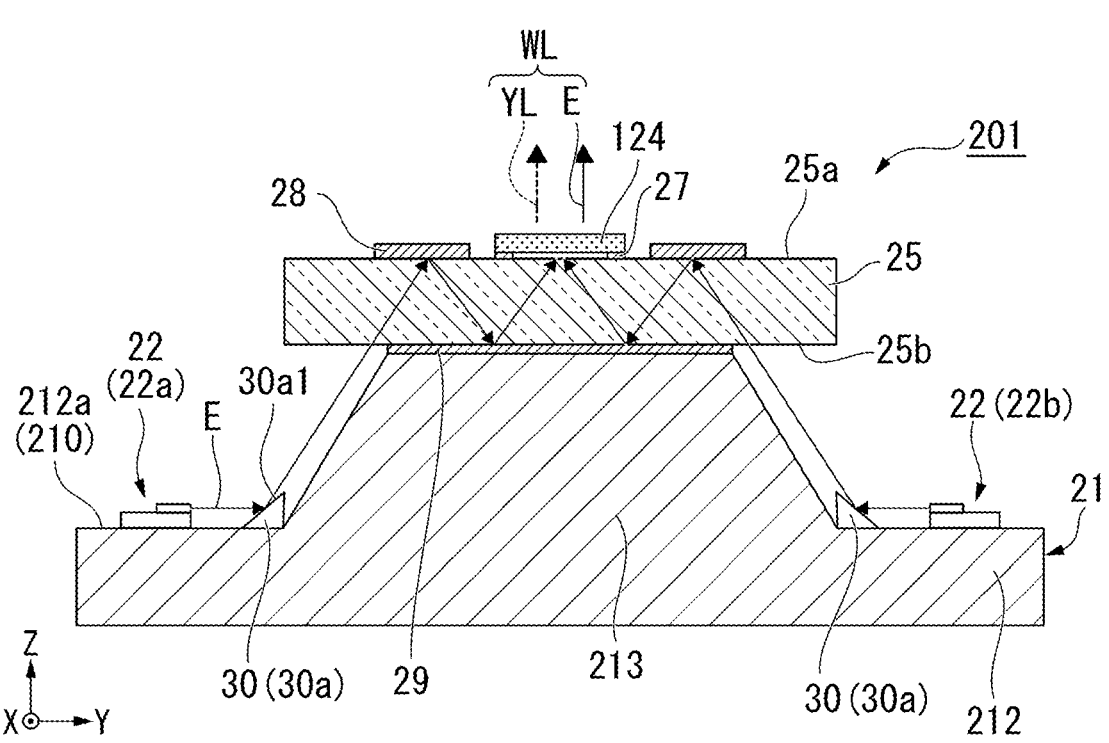
FIG. 7 is a diagram showing a configuration of a light source device according to a third embodiment.

FIG. 7 is a diagram showing the configuration of the light source device according to the present embodiment.

As shown in FIG. 7, the light source device 201 according to the present embodiment is provided with the base 21, the plurality of laser emitters 22, the wavelength converter 124, the light transmissive member 25, the spacer 27, the first reflector 28, the second reflector 29, and an optical element 30.

In the light source device 201 according to the present embodiment, the laser emitters 22 are arranged on the surface 212$a$ of the base part 212 of the base 21 so as to surround the periphery of the protruding part 213. In other words, in the case of the present embodiment, the laser emitters 22 each emit the excitation light E along the surface 212$a$ of the base part 212. In the present embodiment, the base part 212 of the base 21 constitutes the first support part 210 for supporting the plurality of laser emitters 22.

The optical element 30 is opposed to the laser emitters 22 disposed at the light exit side of the laser emitters 22, and folds the light paths of the excitation light E emitted from the laser emitters 22 toward the reverse surface 25$b$ of the light transmissive member 25. The optical element 30 includes a plurality of triangular prisms 30$a$. The triangular prisms 30$a$ are disposed so as to correspond respectively to the laser emitters 22. The triangular prisms 30$a$ are disposed on the surface 212$a$ of the base part 212 so as to be opposed to the light exit side of the respective laser emitters 22. Since the triangular prism 30$a$ is constituted by flat surfaces, it becomes easy to mount the triangular prism 30$a$ on the surface 212$a$ of the base part 212.

The triangular prisms 30$a$ each fold the light path of the excitation light E emitted from the corresponding laser emitter 22 toward the reverse surface 25$b$ of the light transmissive member 25. The triangular prisms 30$a$ each have a reflecting surface 30$a$1 for reflecting the excitation light E toward the first reflector 28.

In the light source device 201 according to the present embodiment, the excitation light E emitted from each of the laser emitters 22 is reflected by the reflecting surface 30*a*1 of the triangular prism 30*a*, and then enters the light transmissive member 25. The excitation light E enters the first reflector 28 disposed on the obverse surface 25*a* of the light transmissive member 25 from the reverse surface 25*b* of the light transmissive member 25. The first reflector 28 reflects the excitation light E toward the second reflector 29. The second reflector 29 reflects the excitation light E toward the wavelength converter 124.

According to the light source device 201 related to the present embodiment, it is possible to bend the light path of the excitation light E emitted from each of the laser emitters 22 supported on the base part 212 of the base 21 using the triangular prism 30*a* to make the excitation light E enter the light transmissive member 25. Therefore, since the first support part 210 on which the laser emitters 22 are mounted is provided to the base part 212 of the base 21, the heat of each of the laser emitters 22 is released to the base part 212 without passing the protruding part 213. As described above, according to the light source device 201 related to the present embodiment, since the thermal resistance of the base 21 decreases, it is possible to enhance the cooling performance of the laser emitters 22.

Further, since the base 21 releases the heat of the triangular prisms 30*a*, it is possible to prevent the breakage of the triangular prisms 30*a* due to the heat.

It should be noted that it is possible to scatter the excitation light E on the plane of incidence 124*a* to thereby increase the efficiency of taking the excitation light E into the wavelength converter 124 by disposing the uneven structure 26 on the plane of incidence 124*a* of the wavelength converter 124 instead of the spacer 27 in the light source device 202 according to the present embodiment. Further, it is possible to dispose both of the spacer 27 and the uneven structure 26.

Fourth Embodiment

Then, a configuration of a light source device according to a fourth embodiment of the present disclosure will be described. It should be noted that in the present embodiment, constituents or members common to the second embodiment will be denoted by the same reference symbols, and the detailed description thereof will be omitted.

Figure 8:
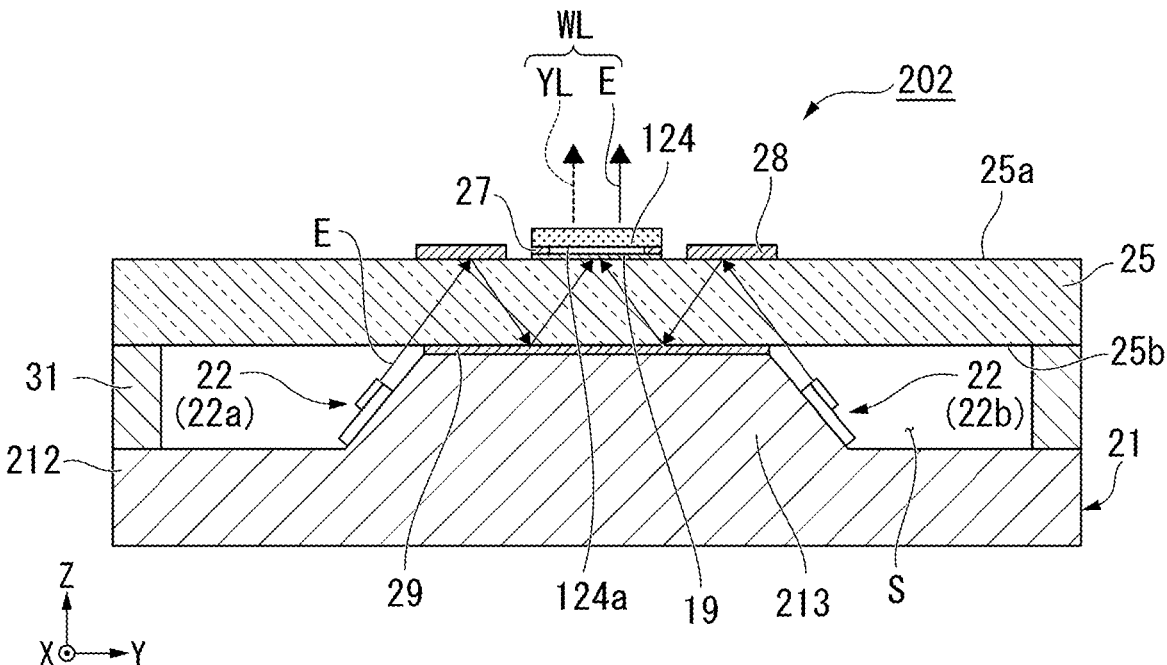
FIG. 8 is a diagram showing a configuration of a light source device according to a fourth embodiment.

FIG. 8 is a diagram showing the configuration of the light source device according to the present embodiment.

As shown in FIG. 8, the light source device 202 according to the present embodiment is provided with the base 21, the plurality of laser emitters 22, the wavelength converter 124, the light transmissive member 25, the spacer 27, the first reflector 28, the second reflector 29, the optical element 30, a side plate part 31, and an optical layer 19.

The light source device 202 according to the present embodiment has a package structure in which the plurality of laser emitters 22 is housed in the space S constituted by the base 21, the side plate part 31, and the light transmissive member 25. It should be noted that it is desirable for the space S to be airtightly sealed.

The side plate part 31 surrounds the outer edge of the base 21 so as to form a frame-like shape to support the light transmissive member 25. The side plate part 31 is disposed so as to protrude toward one surface of the base 21. The side plate part 31 has an annular shape in the plan view. The side plate part 31 keeps a distance (clearance) between the base

21 and the light transmissive member 25 constant. Therefore, it is preferable for the side plate part 31 to have predetermined rigidity.

It is preferable for the side plate part 31 to be formed of a material having a linear expansion coefficient lower than the linear expansion coefficient of the base 21 and higher than the linear expansion coefficient of the light transmissive member 25. As the material of the side plate part 31, there is preferably used a metal material such as Kovar, or a ceramic material such as alumina, silicon carbide, or silicon nitride, and there is particularly preferably used Kovar or alumina.

The optical layer 19 is arranged between the plane of incidence 124*a* of the wavelength converter 124 and the obverse surface 25*a* of the light transmissive member 25. In the case of the present embodiment, the optical layer 19 is disposed on the obverse surface 25*a* of the light transmissive member 25. Specifically, the optical layer 19 is disposed in an area opposed to the plane of incidence 124*a* of the wavelength converter 124 out of the obverse surface 25*a* of the light transmissive member 25. The optical layer 19 is formed of a dichroic film which transmits the excitation light E and reflects the fluorescence YL.

According to the light source device 202 related to the present embodiment, since the optical layer 19 is disposed on the plane of incidence 124*a* of the wavelength converter 124, it is possible to prevent the deterioration of the efficiency of taking out the fluorescence YL caused by the fact that the fluorescence YL obtained by the wavelength conversion in the wavelength converter 124 is emitted from the plane of incidence 124*a* to return toward the obverse surface 25*a* of the light transmissive member 25.

Further, since the light transmissive member 25 also functions as a sealing substrate for airtightly sealing the laser emitters 22, additional members for sealing becomes unnecessary, and therefore, it is possible to reduce the manufacturing cost.

It should be noted that in the light source device 202 according to the present embodiment, the optical layer 19 can be disposed on the plane of incidence 124*a* of the wavelength converter 124.

Further, it is possible to scatter the excitation light E on the plane of incidence 124*a* to thereby increase the efficiency of taking the excitation light E into the wavelength converter 124 by disposing the uneven structure 26 on the plane of incidence 124*a* of the wavelength converter 124 instead of the spacer 27 in the light source device 202 according to the present embodiment. Further, it is possible to dispose both of the spacer 27 and the uneven structure 26.

Further, in the light source device 202 according to the present embodiment, it is possible to make the excitation light E directly enter the wavelength converter as in the first embodiment without using the first reflector 28 and the second reflector 29.

Fifth Embodiment

Then, a configuration of a light source device according to a fifth embodiment of the present disclosure will be described. It should be noted that in the present embodiment, constituents or members common to the second embodiment will be denoted by the same reference symbols, and the detailed description thereof will be omitted.

Figure 9:
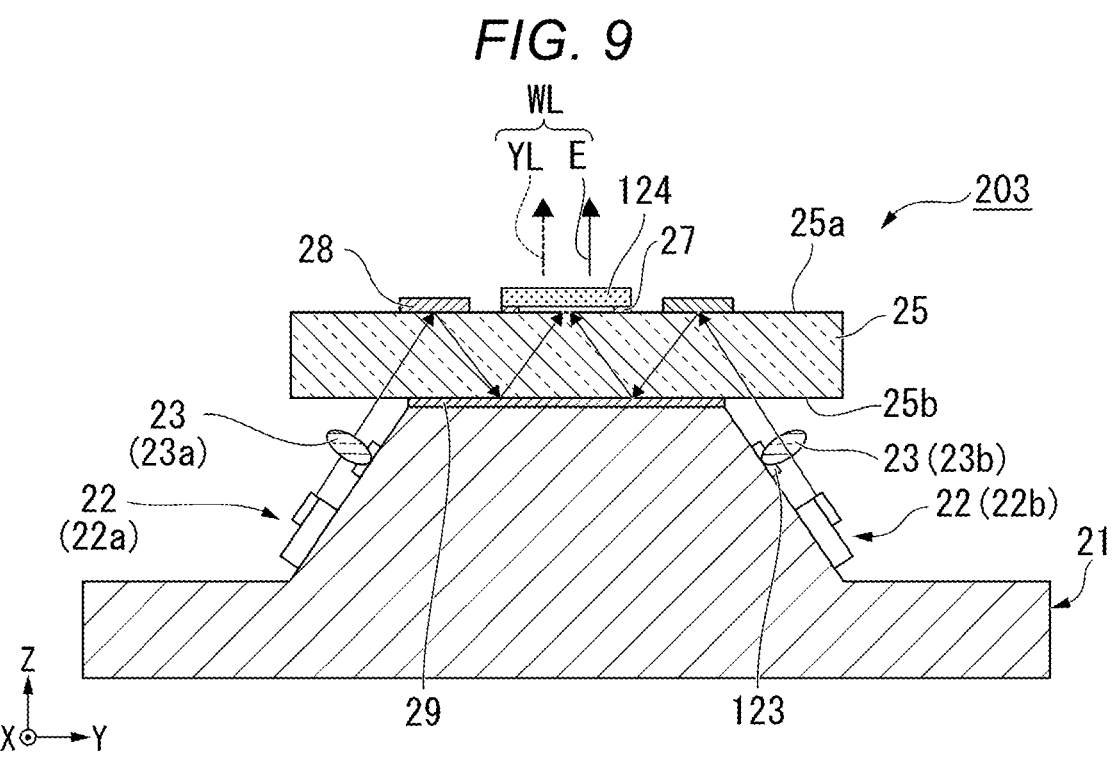
FIG. 9 is a diagram showing a configuration of a light source device according to a fifth embodiment.

FIG. 9 is a diagram showing the configuration of the light source device according to the present embodiment.

As shown in FIG. 9, the light source device 203 according to the present embodiment is provided with the base 21, the plurality of laser emitters 22, the wavelength converter 124, the light transmissive member 25, the spacer 27, the first reflector 28, the second reflector 29, the optical element 30, and a plurality of collimator lenses 23.

In the light source device 203 according to the present embodiment, the plurality of collimator lenses 23 is disposed so as to correspond to the plurality of laser emitters 22. The collimator lenses 23 are each arranged between the laser emitter 22 and the light transmissive member 25, and each collimate the excitation light E emitted from the corresponding laser emitter 22. The collimator lenses 23 are each supported by the first support part 210 via a lens holder 123.

The collimator lenses 23 are each formed of, for example, a spherical lens. It should be noted that it is also possible for the collimator lens 23 to be formed of a diffraction-type lens. Since the diffraction-type lens is shaped like a plane, a burden of ensuring the mounting accuracy is reduced, and therefore, it is possible to obtain equivalent advantages as the spherical lens as described above.

In the present embodiment, the plurality of collimator lenses 23 includes a first collimator lens (a first optical system) 23a corresponding to the first laser emitter 22a, and a second collimator lens (a second optical system) 23b corresponding to the second laser emitter 22b. In the present embodiment, the collimator lenses 23 are separated from each other, and are arranged at a distance from each other.

According to the light source device 203 related to the present embodiment, by arranging the collimator lenses 23 for substantially collimating the excitation light E between the respective laser emitters 22 and the light transmissive member 25, it is possible to control the intensity distribution of the excitation light E entering the wavelength converter 124. Thus, it is possible to suppress the light which fails to enter the wavelength converter 124, and thus becomes the stray light, and the light which is reflected by the surface of the wavelength converter 124, and thus becomes the stray light. Therefore, it is possible to efficiently use the excitation light E for the excitation of the fluorescence YL.

Further, it is possible to scatter the excitation light E on the plane of incidence 124a to thereby increase the efficiency of taking the excitation light E into the wavelength converter 124 by disposing the uneven structure 26 on the plane of incidence 124a of the wavelength converter 124 instead of the spacer 27 in the light source device 203 according to the present embodiment. Further, it is possible to dispose both of the spacer 27 and the uneven structure 26.

Further, in the light source device 203 according to the present embodiment, it is possible to make the excitation light E directly enter the wavelength converter as in the first embodiment without using the first reflector 28 and the second reflector 29.

Figure 10:
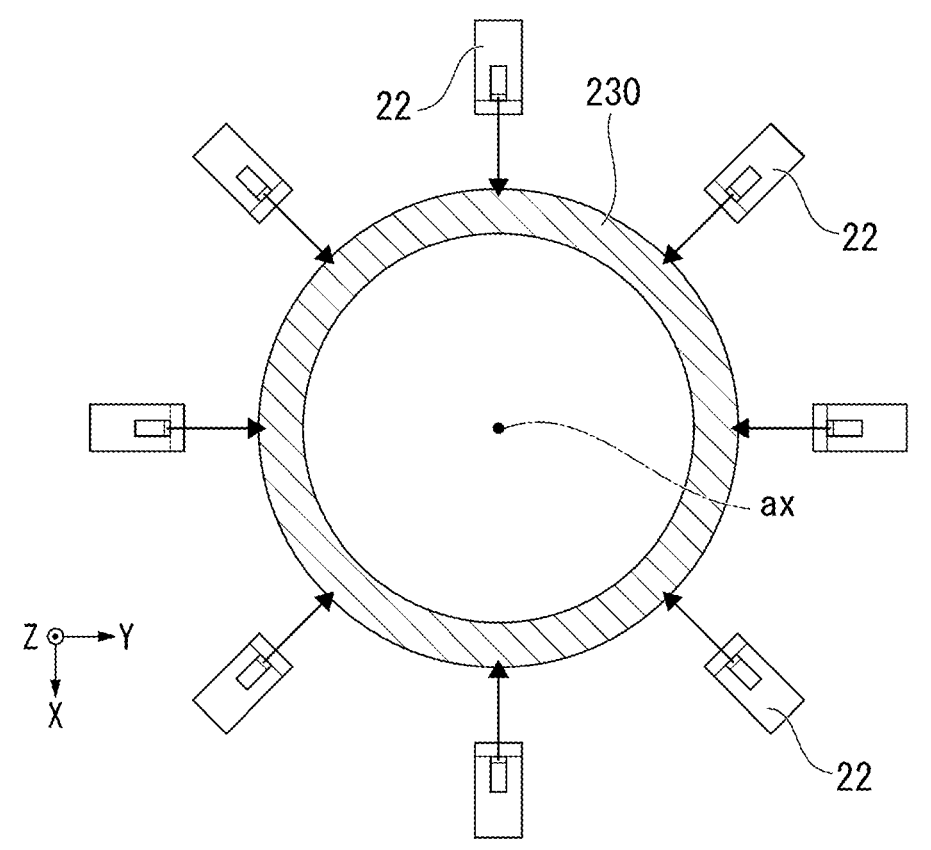
FIG. 10 is a diagram showing a configuration according to a modified example of the fifth embodiment.

There is cited when the collimator lenses 23 are formed separately from each other as an example in the light source device 203 according to the present embodiment, but it is possible to dispose an integrated optical system 230 corresponding to the laser emitters 22 as shown in FIG. 10.

According to this configuration, since it becomes easy to adjust the positions of the laser emitters 22 and the optical system 230, it is possible to prevent a decrease in light use efficiency of the excitation light E due to a mounting error of the laser emitters 22.

It should be noted that although the description is presented illustrating the embodiments of the present disclosure, the present disclosure is not necessarily limited to the embodiments described above, but a variety of modifications can be added within the scope or the spirit of the present disclosure.

First Modified Example

For example, in the light source device 200 according to the second embodiment, it is possible to dispose a diffuser in a light path of the excitation light E from each of the laser emitters 22 to the plane of incidence 24a of the wavelength converter 24.

Figure 11A:
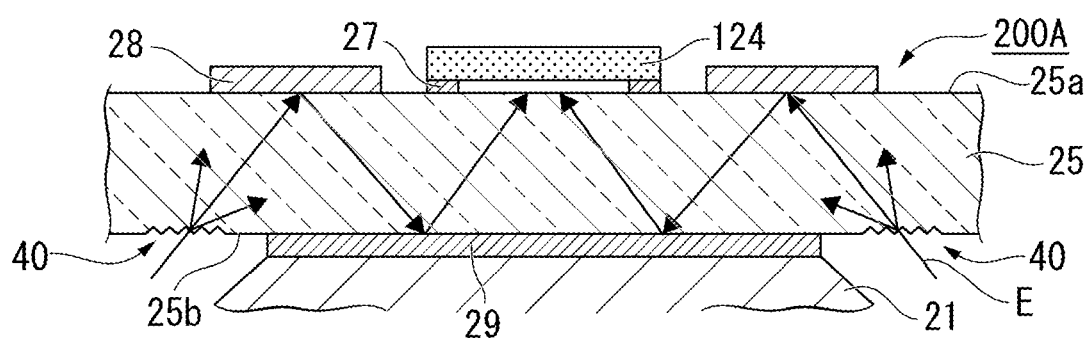
FIG. 11A is a diagram showing a configuration of an essential part of a light source device according to a first modified example.

FIG. 11A is a diagram showing a configuration of an essential part of a light source device 200A according to the present modified example.

As shown in FIG. 11A, the light source device 200A according to the present modified example is further provided with the diffuser 40. The diffuser 40 is arranged in an area where the excitation light E enters on the reverse surface 25b of the light transmissive member 25. The diffuser 40 is formed of an uneven structure formed by performing, for example, a sandblast treatment on the reverse surface 25b.

According to the light source device 200A related to the present modified example, it is possible to scatter the excitation light E when passing through the diffuser 40. Thus, since the homogeneity of the light intensity distribution of the excitation light E is enhanced, it is possible to prevent the decrease in fluorescence conversion efficiency and the breakage due to the heat generation in the wavelength converter 124.

It should be noted that it is possible to form the diffuser 40 in the area where the excitation light E enters on the reverse surface 25b by applying the present modified example to the light source device 20 according to the first embodiment.

Further, although the diffuser 40 is formed on the reverse surface 25b of the light transmissive member 25 in the present modified example, it is possible to arrange a diffuser element as a separate member from the light transmissive member 25 between the reverse surface 25b and the laser emitter 22.

Second Modified Example

Figure 11B:
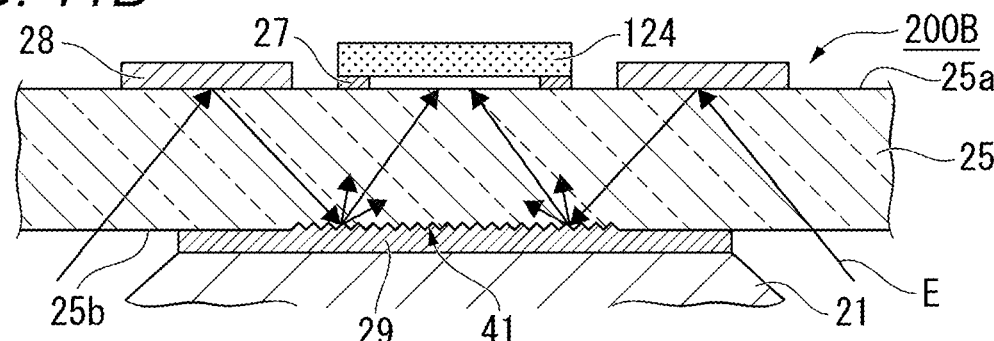
FIG. 11B is a diagram showing a configuration of an essential part of a light source device according to a second modified example.

FIG. 11B is a diagram showing a configuration of an essential part of a light source device 200B according to the present modified example.

As shown in FIG. 11B, the light source device 200B according to the present modified example is further provided with a diffuser 41. The diffuser 41 is formed on a reflecting surface of the second reflector 29. The diffuser 41 is formed of an uneven structure formed by performing, for example, a sandblast treatment on the reverse surface 25b of the light transmissive member 25 forming the reflecting surface of the second reflector 29.

According to the light source device 200B related to the present modified example, when reflecting the excitation light E with the second reflector 29, it is possible to reflect the excitation light E in a scattered state due to the diffuser 41. Thus, since the homogeneity of the light intensity distribution of the excitation light E is enhanced, it is possible to prevent the decrease in fluorescence conversion efficiency and the breakage due to the heat generation in the wavelength converter 124.

Third Modified Example

Figure 11C:
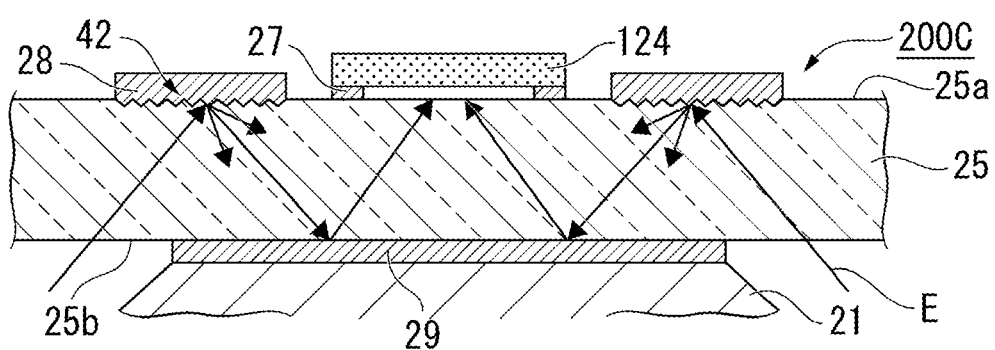
FIG. 11C is a diagram showing a configuration of an essential part of a light source device according to a third modified example.

FIG. 11C is a diagram showing a configuration of an essential part of a light source device 200C according to the present modified example.

As shown in FIG. 11C, the light source device 200C according to the present modified example is further provided with a diffuser 42. The diffuser 42 is formed on a reflecting surface of the first reflector 28. The diffuser 42 is formed of an uneven structure formed by performing, for example, a sandblast treatment on the obverse surface 25a of the light transmissive member 25 forming the reflecting surface of the first reflector 28.

According to the light source device 200C related to the present modified example, when reflecting the excitation light E with the first reflector 28, it is possible to reflect the excitation light E in a scattered state due to the diffuser 42. Thus, since the homogeneity of the light intensity distribution of the excitation light E is enhanced, it is possible to prevent the decrease in fluorescence conversion efficiency and the breakage due to the heat generation in the wavelength converter 124.

Fourth Modified Example

Figure 11D:
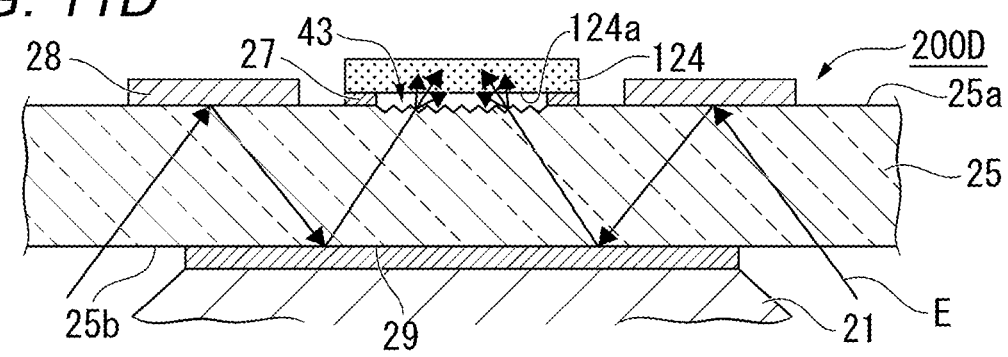
FIG. 11D is a diagram showing a configuration of an essential part of a light source device according to a fourth modified example.

FIG. 11D is a diagram showing a configuration of an essential part of a light source device 200D according to the present modified example.

As shown in FIG. 11D, the light source device 200D according to the present modified example is further provided with a diffuser 43. The diffuser 43 is arranged between the plane of incidence 124a of the wavelength converter 124 and the obverse surface 25a of the light transmissive member 25. Specifically, the diffuser 43 is formed in an area opposed to the plane of incidence 124a of the wavelength converter 124 out of the obverse surface 25a of the light transmissive member 25. The diffuser 43 is formed of an uneven structure formed by performing, for example, a sandblast treatment on the obverse surface 25a.

According to the light source device 200D related to the present modified example, it is possible to scatter the excitation light E when passing through the diffuser 43. Thus, since it is possible to make the excitation light E enhanced in homogeneity of the light intensity distribution enter the plane of incidence 124a of the wavelength converter 124, it is possible to prevent the decrease in fluorescence conversion efficiency and the breakage due to the heat generation in the wavelength converter 124.

It should be noted that it is possible for the light source device to adopt a structure obtained by combining two or more of the diffusers 40, 41, 42, and 43 in the first modified example through the fourth modified example.

Further, in the light source devices according to the embodiments and modified examples described above, there is cited when emitting the illumination light WL having a white color including the excitation light E and the fluorescence YL as an example, it is possible to arrange that yellow light including only the fluorescence YL is taken out as the illumination light by adjusting the thickness of the wavelength converter 24, 124 and the light intensity of the excitation light E. In this case, by forming a dichroic film for reflecting the excitation light E and transmitting the fluorescence YL on the exit surface of the wavelength converter 24, 124, it is possible to efficiently take out only the fluorescence YL as the illumination light.

Further, in the light source devices according to the embodiments and the modified examples described above, there is cited when the plurality of laser emitters 22 is provided as an example, the number of the laser emitters 22 is not a limitation, and it is possible to adopt a configuration including only the first laser emitter 22a.

Further, although in the embodiments described above, there is illustrated the projector 1 provided with the three light modulation devices 4R, 4G, and 4B, the present disclosure can also be applied to a projector for displaying a color picture with a single light modulation device. Further, the light modulation device is not limited to the liquid crystal panel described above, but a digital mirror device, for example, can also be used.

Further, although in the embodiments described above, there is described the example of applying the light source device according to the present disclosure to the projector, this is not a limitation. The light source device according to the present disclosure can also be applied to lighting equipment such as a headlight for a vehicle.

A light source device according to an aspect of the present disclosure may have the following configuration.

The light source device according to an aspect of the present disclosure includes a first laser emitter configured to emit first light in a first wavelength band, a light transmissive member which has a first surface and a second surface opposite to the first surface, and the second surface which the first light emitted from the first laser emitter enters, a base having a first support part configured to support the first laser emitter, and a second support part configured to support the light transmissive member, and a wavelength converter which is arranged on the first surface of the light transmissive member, and which is configured to convert the first light into second light in a second wavelength band different from the first wavelength band, wherein the wavelength converter has a plane of incidence including an incident area where the first light enters, and an exit surface which is disposed at an opposite side to the plane of incidence, and which is configured to emit the second light, and the second support part supports an area corresponding to the incident area out of the second surface of the light transmissive member.

In the light source device according to the aspect of the present disclosure, there may be adopted a configuration in which an air layer is disposed between the plane of incidence of the wavelength converter and the first surface of the light transmissive member.

In the light source device according to the aspect of the present disclosure, there may be adopted a configuration in which one of the plane of incidence of the wavelength converter and an area opposed to the plane of incidence in the first surface of the light transmissive member is provided with an uneven structure, and the air layer is provided to the uneven structure.

In the light source device according to the aspect of the present disclosure, there may be adopted a configuration further including a spacer arranged between the plane of incidence of the wavelength converter and the first surface of the light transmissive member, wherein the air layer is disposed in a space formed by the spacer between the plane of incidence and the first surface.

In the light source device according to the aspect of the present disclosure, there may be adopted a configuration further including an optical element which is opposed to the first laser emitter disposed at a light exit side of the first laser emitter, and which is configured to fold a light path of the first light emitted from the first laser emitter toward the second surface of the light transmissive member.

In the light source device according to the aspect of the present disclosure, there may be adopted a configuration further including a first reflector arranged in an area different from the wavelength converter on the first surface, and a second reflector arranged between the second support part and the second surface of the light transmissive member, wherein the first reflector reflects the first light emitted from the first laser emitter toward the second reflector, and the second reflector reflects the first light reflected by the first reflector, toward the wavelength converter.

In the light source device according to the aspect of the present disclosure, there may be adopted a configuration further including a diffuser configured to diffuse the first light, wherein the diffuser is formed on at least one of a reflecting surface of the first reflector and a reflecting surface of the second reflector.

In the light source device according to the aspect of the present disclosure, there may be adopted a configuration further including a diffuser configured to diffuse the first light, wherein the diffuser is arranged in a light path of the first light from the first laser emitter to the plane of incidence of the wavelength converter.

In the light source device according to the aspect of the present disclosure, there may be adopted a configuration in which the diffuser is arranged in an area where the first light emitted from the first laser emitter enters on the second surface of the light transmissive member.

In the light source device according to the aspect of the present disclosure, there may be adopted a configuration in which the diffuser is arranged between the plane of incidence of the wavelength converter and the first surface of the light transmissive member.

In the light source device according to the aspect of the present disclosure, there may be adopted a configuration further including an optical layer which is arranged between the plane of incidence of the wavelength converter and the first surface of the light transmissive member, and which is configured to transmit the first light and reflect the second light.

In the light source device according to the aspect of the present disclosure, there may be adopted a configuration further including a first optical system which is arranged between the first laser emitter and the light transmissive member, and which is configured to collimate the first light emitted from the first laser emitter.

In the light source device according to the aspect of the present disclosure, there may be adopted a configuration further including a second laser emitter configured to emit the first light, and a second optical system configured to collimate the first light emitted from the second laser emitter, wherein the first optical system and the second optical system are separated from each other, and are arranged at a distance from each other.

In the light source device according to the aspect of the present disclosure, there may be adopted a configuration further including a second laser emitter configured to emit the first light, and a second optical system configured to collimate the first light emitted from the second laser emitter, wherein the first optical system and the second optical system are integrally formed.

In the light source device according to the aspect of the present disclosure, there may be adopted a configuration in which the second support part has a support surface configured to support the second surface of the light transmissive member, and the support surface is larger in area than the incident area of the wavelength converter.

A projector according to an aspect of the present disclosure may have the following configuration.

The projector according to the aspect of the present disclosure includes the light source device according to one of the above aspects of the present disclosure, a light modulation device configured to modulate the light from the light source device, and a projection optical device configured to project the light modulated by the light modulation device.

What is claimed is:

1. A light source device comprising:
a first laser emitter configured to emit first light in a first wavelength band;
a light transmissive member having a first surface and a second surface opposite to the first surface, the first light emitted from the first laser emitter being incident on the second surface;
a base having a first support part configured to support the first laser emitter and a second support part configured to support the light transmissive member; and
a wavelength converter arranged on the first surface of the light transmissive member and configured to convert the first light into second light in a second wavelength band different from the first wavelength band, wherein
the wavelength converter has an incident surface including an incident area where the first light enters and an emission surface disposed at an opposite side to the incident surface and configured to emit the second light, and
the second support part supports the second surface of the light transmissive member in an area corresponding to the incident area.

2. The light source device according to claim 1, wherein an air layer is disposed between the incident surface of the wavelength converter and the first surface of the light transmissive member.

3. The light source device according to claim 2, wherein an uneven structure is provided to one of the incident surface of the wavelength converter and an area, in the first surface of the light transmissive member, opposed to the incident surface, and
the air layer is provided to the uneven structure.

4. The light source device according to claim 2, further comprising:
a spacer arranged between the incident surface of the wavelength converter and the first surface of the light transmissive member, wherein
the air layer is disposed in a space formed by the spacer between the incident surface and the first surface.

5. The light source device according to claim 1, further comprising:
an optical element disposed at a light emitting side of the first laser emitter and facing the first laser emitter, the optical element being configured to fold a light path of the first light emitted from the first laser emitter toward the second surface of the light transmissive member.

6. The light source device according to claim 1, further comprising:
a first reflector arranged in an area different from the wavelength converter on the first surface; and
a second reflector arranged between the second support part and the second surface of the light transmissive member, wherein
the first reflector reflects the first light emitted from the first laser emitter toward the second reflector, and
the second reflector reflects the first light reflected by the first reflector, toward the wavelength converter.

7. The light source device according to claim 6, further comprising:
a diffuser configured to diffuse the first light, wherein
the diffuser is formed on at least one of a reflecting surface of the first reflector and a reflecting surface of the second reflector.

8. The light source device according to claim 1, further comprising:

a diffuser configured to diffuse the first light, wherein the diffuser is arranged in a light path of the first light from the first laser emitter to the incident surface of the wavelength converter.

9. The light source device according to claim 8, wherein the diffuser is arranged at the second surface of the light transmissive member in an area where the first light emitted from the first laser emitter enters.

10. The light source device according to claim 8, wherein the diffuser is arranged between the incident surface of the wavelength converter and the first surface of the light transmissive member.

11. The light source device according to claim 1, further comprising:

an optical layer arranged between the incident surface of the wavelength converter and the first surface of the light transmissive member and configured to transmit the first light and reflect the second light.

12. The light source device according to claim 1, further comprising:

a first optical system arranged between the first laser emitter and the light transmissive member and configured to collimate the first light emitted from the first laser emitter.

13. The light source device according to claim 12, further comprising:

a second laser emitter configured to emit the first light; and a second optical system configured to collimate the first light emitted from the second laser emitter, wherein the first optical system and the second optical system are separated from each other, and are arranged at a distance from each other.

14. The light source device according to claim 12, further comprising:

a second laser emitter configured to emit the first light; and a second optical system configured to collimate the first light emitted from the second laser emitter, wherein the first optical system and the second optical system are integrated into a single member.

15. The light source device according to claim 1, wherein the second support part has a support surface configured to support the second surface of the light transmissive member, and the support surface is larger in area than the incident area of the wavelength converter.

16. A projector comprising:

the light source device according to claim 1;

a light modulation device configured to modulate the light emitted from the light source device; and a projection optical device configured to project the light modulated by the light modulation device.

* * * * *